ELECTRICAL SYSTEM FOR ETCHING A TUNNEL DIODE

Filed Sept. 14, 1964

2 Sheets-Sheet 1

ETCHING SYSTEM

INVENTOR.

JOSEPH F. SPRINGER, JR.

BY D.R. Pressman

ATTORNEY

April 9, 1968 J. F. SPRINGER, JR 3,377,263
ELECTRICAL SYSTEM FOR ETCHING A TUNNEL DIODE
Filed Sept. 14, 1964 2 Sheets-Sheet 2
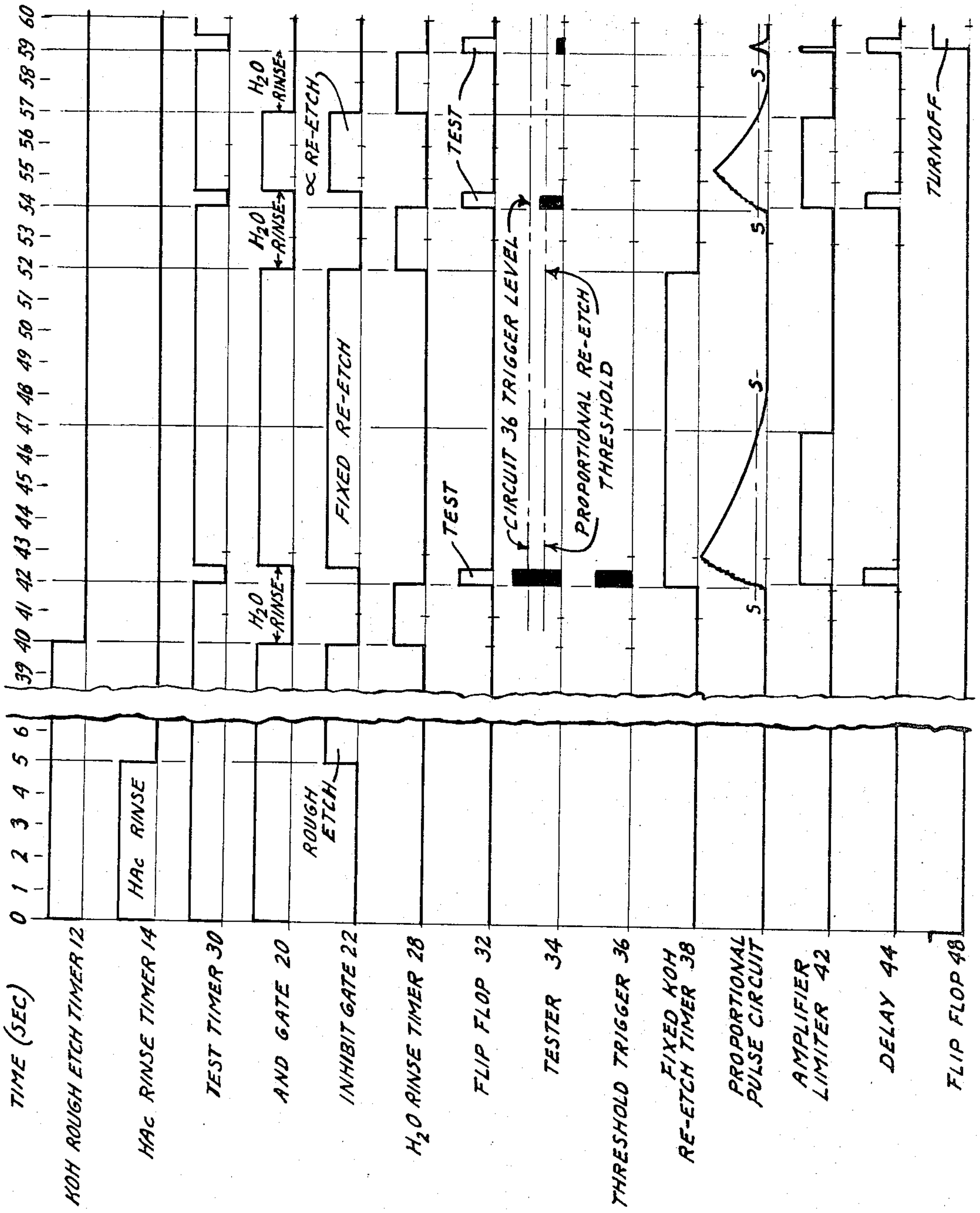
FIG. 2. OUTPUT WAVEFORMS IN FIG. 1. SYSTEM
INVENTOR.
JOSEPH F. SPRINGER, JR.
BY
D R Pressman
ATTORNEY

United States Patent Office 3,377,263
Patented Apr. 9, 1968

3,377,263

ELECTRICAL SYSTEM FOR ETCHING A TUNNEL DIODE

Joseph F. Springer, Jr., Philadelphia, Pa., assignor to Philco-Ford Corporation, Philadelphia, Pa., a corporation of Delaware Filed Sept. 14, 1964, Ser. No. 396,150
4 Claims. (Cl. 204—224)

Figure 1:
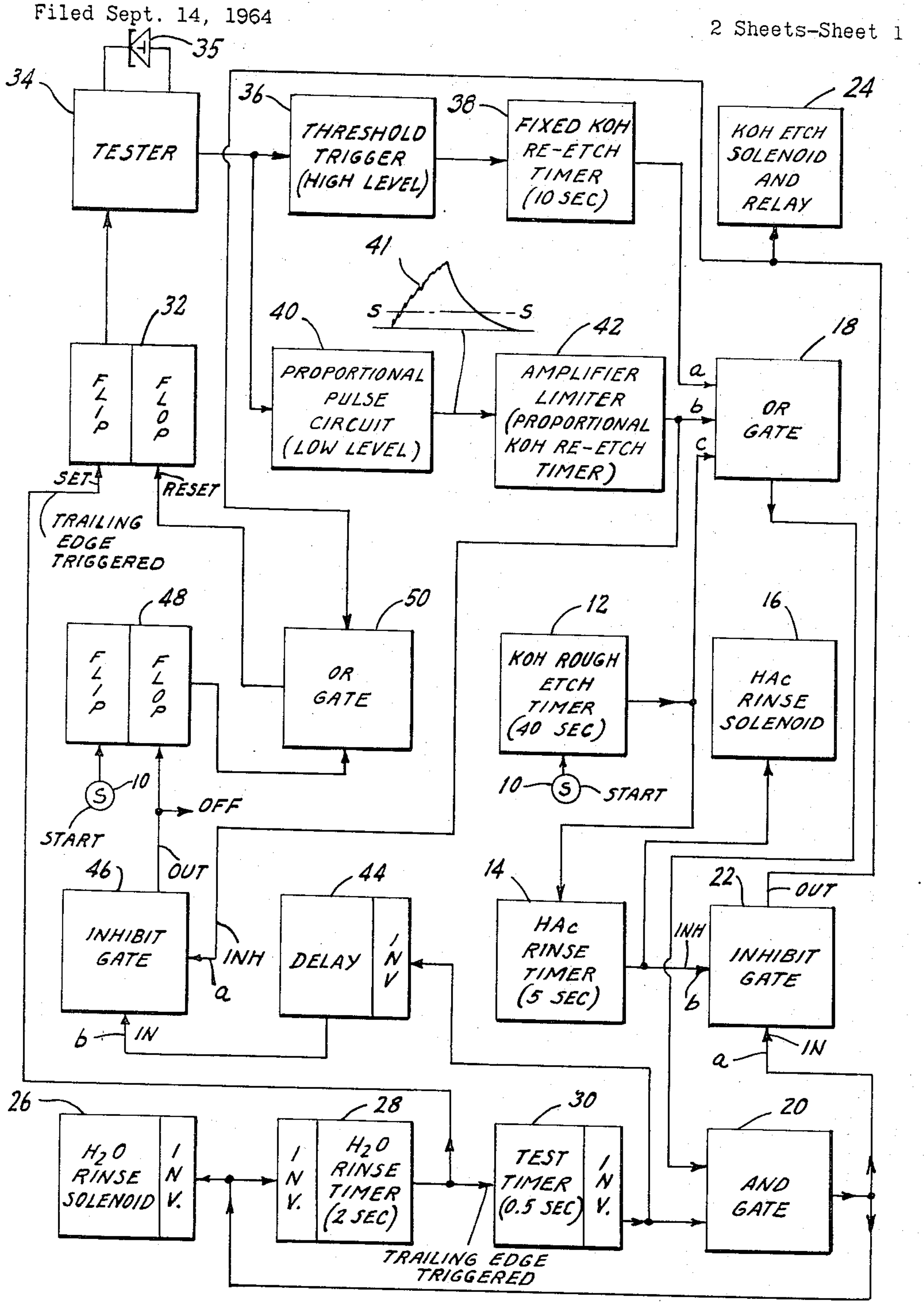

This invention relates generally to automated material processing systems and particularly to a system for automatically performing interrelated timing and testing operations such as those needed to etch automatically tunnel diodes.

Tunnel diodes have become increasingly popular devices for use as circuit elements in the last few years. Tunnel diodes are generally fabricated by shallow alloying a pellet of a strong dopant of one conductivity into a wafer of strongly doped semiconductive material of opposite conductivity to form contiguous and strongly doped regions having a very narrow junction therebetween. The P-N structure thus formed is soldered to a case mounting having leads. The diode is then electrolytically etched in order to decrease the lateral area of the junction so that the current peak of the diode will be lowered to a prescribed value. Thereafter the case is hermetically sealed with a suitable potting material in order to encapsulate the diode.

It will be appreciated that the etching step is tedious and difficult to perform. The diode must be etched for a period in an etching solution, rinsed in water to remove the highly conductive etching solution from the diode's surface, and then electronically tested to ascertain its peak current value. If the peak current is too high, the process must be repeated until the peak current value reaches the prescribed level. If the diode is etched too long, its peak current value will be too low and the diode must be discarded.

OBJECTS

Accordingly, several objects of the present invention are:

(1) To provide a method for automatically performing interrelated timing and testing operations, (2) To provide a method for automatically processing and etching tunnel diodes, (3) To provide a system for automatically etching tunnel diodes without overetching said diodes.

Other objects and advantages of the invention will become apparent from a consideration of the ensuing description thereof.

SUMMARY

According to the present invention an element having a parameter whose value is to be adjusted below a desired level is first tested to ascertain the value of said parameter. If the tested value is above a first level, the element is processed to change the value of said parameter by a fixed amount. If the tested value is below the first level, the element is processed to change the value of said parameter by an amount proportional to the tested value. Thereafter the element is tested and processed again in like manner until the value of the parameter measures below the desired value.

DRAWINGS

A system according to the invention is shown in FIG. 1 of the drawings, while a waveform diagram for said system is shown in FIG. 2 thereof.

OVERALL PROCESS

According to one preferred form of the system a tunnel diode to be etched is physically mounted and electrically connected to a suitable carrier and inserted (manually or automatically) into an etching chamber. A typical etching chamber may have inlet tubes arranged to supply a cleaning solution, an etching solution, and a rinse to the tunnel diode during appropriate intervals, with a drain for carrying away the solutions once they have been used. For example, in tunnel diode etching the cleaning solution may be acetic acid (HAc), the etching solution a potassium hydroxide (KOH) solution, and the rinse deionized water.

The carrier preferably includes terminals which connect with the anode and cathode terminals of the diode so that the diode may be connected by a suitable switching arrangement to a tester during test intervals and to the etching circuit during the etch intervals.

After the carrier is inserted into the etching chamber, the system is activated. In a typical procedure an HAc rinse is applied to the diode for 5 seconds. Thereafter the diode is subjected to a KOH rough etch for a selected period. The initial etch should be made short enough so that all diodes will require one or more fixed re-etches, thereby precluding the possibility of overetching on the initial etch. It has been found that when fabricated as suggested above, the peak current value of all diodes is high enough to require that all diodes be subjected to a preliminary 35-second rough etch before undergoing more controlled etches. After the rough etch, the diode is then rinsed in deionized water for about 2 seconds and its peak current value ascertained by means of a curve tracer which is turned on for a 0.5-second interval. If the peak current is above a predetermined first value, the diode is subjected to a fixed re-etch of KOH for about 10 seconds. If the peak current is below the first value but above a second value, the diode is subjected to a proportional re-etch of KOH for a period of up to about 5 seconds, in proportion to the exact value of the peak current. After the first re-etch, the diode is rinsed again in water, retested by means of the curve tracer, and then subjected to a fixed or proportional re-etch, depending on the results of the retest. When the peak current of the diode reaches the desired value the system is turned off and the carrier is removed (automatically or manually) from the etching chamber.

STRUCTURAL DESCRIPTION

Apparatus for performing the aforedescribed functional operations is shown in FIG. 1 of the drawing. Each of the circuits or circuit elements represented by a block in FIG. 1 is either commercially available as a unit or is well known to the art. Therefore the following brief descriptions of the circuits represented by these blocks, without any detailed drawings of the circuits contained therein, is believed to be sufficient to enable one skilled in the art to practice the invention.

KOH ROUGH ETCH TIMER 12 is designed to energize its output lead for a 40-second interval when START button 10 is actuated. An appropriate circuit for timer 12 is shown in the copending application of the present inventor, Serial No. 415,313, filed December 2, 1964, and assigned to the present asignee. As shown in this copending application timer 12 includes a flip flop, a capacitive charging circuit, and a threshold trigger circuit. The flip flop is SET when button 10 is actuated. The output voltage from one side of the flip flop in its SET state switches on the capacitive charging circuit. The voltage across the capacitor is sensed by the threshold trigger circuit which provides an abrupt output trigger signal to RESET the flip flop when the capacitor is charged to a selected voltage level. The time constant of the capacitive charging circuit is selected so that the charging time of the capacitor to the voltage level which will actuate the threshold circuit corresponds to the desired time interval. The output voltage from the other side of the flip flop constitutes the output of the timer, which, of course, assumes a discretely different value during the timed interval than before or after said interval. In lieu of the aforedescribed arrangement, timer 12 may comprise a conventional long duration monostable multivibrator.

HAc RINSE TIMER 14 is connected to the output of timer 12 and is designed to energize its output lead for a 5-second interval when its input is energized. Timer 14 may comprise a series capacitive charging circuit followed by a threshold circuit. The leading edge of the 40-second output pulse from timer 12 will actuate the threshold circuit immediately, causing it to supply an output. The series capacitor is selected to charge sufficiently to deactuate the threshold circuit after a 5-second interval.

HAc ETCH SOLENOID 16 has an input connected to the output of timer 14. When its input is energized, solenoid 16 will open a valve which allows the acetic acid (HAc) solution to flow over the diode.

OR GATE 18 receives at inputs *a, b,* and *c*, the outputs of timers 38, 42, and 12, respectively. The output of gate 18 is energized whenever *any or all* of inputs *a, b,* and *c* are energized.

AND GATE 20 receives inputs from OR gate 18 and timer 30, respectively. The output of gate 20 is energized whenever *both* of its inputs are energized.

INHIBIT GATE 22 has an "IN" input *a* and an INHIBIT (INH) input *b* connected to the outputs of gate 20 and timer 14, respectively. The output of gate 22 is energized whenever input *a* is energized, *unless* INHIBIT input *b* is also energized.

KOH ETCH SOLENOID AND RELAY 24 is connected to the output of INHIBIT gate 22. Whenever circuit 24 receives an input, a solenoid opens a valve which allows a KOH etching solution to flow over the diode and a relay applies an etching potential across the solution and the diode.

$H_2O$ RINSE SOLENOID 26 includes an input inverter and is connected to the output of AND gate 20. Solenoid 26 allows deionized water to flow over the diode whenever the output of gate 20 is *not* energized.

$H_2O$ RINSE TIMER 28 includes an input inverter and is connected to the output of AND gate 20. Whenever the output of AND gate 20 becomes *deenergized,* timer 28 is triggered and its output lead is energized for 2 seconds.

TEST TIMER 30 has an input connected to the output of timer 28 and includes an output inverter. Time 30 is triggered by the trailing edge of the signal at the output of timer 28. The output of timer 30 will always be energized, except for a 0.5-second interval after the output of timer 28 becomes deenergized.

FLIP FLOP 32 has a SET input connected to the output of rinse timer 28 and a RESET input connected to the output of OR gate 50. The SET input of flip flop 32 is triggered by the trailing edge of the output of timer 28. Thus when its SET input becomes deenergized, the output of flip flop 32 will become energized until its RESET input is energized. Flip flop 32 is arranged so that it cannot be SET when its RESET input is energized.

TESTER 34 has an input connected to the output of flip flop 32. Tester 32 is also connected to the cathode and anode of a tunnel diode 35 which is being processed. When its input is energized, tester 34 will be switched on and output pulses of a voltage proportional to the peak current of the diode are supplied at the output lead of the tester.

Tester 34 may comprise a circuit similar to the one shown within broken line of FIG. 1 of appilcant's copending application, now Patent 3,324,395, issued June 6, 1967, entitled "Apparatus for Determining Characteristics of Tunnel Diodes," and assigned to the present assignee. At the collector of transistor 16 of the circuit of said application will appear voltage pulses proportional to the peak current of the diode under test. The tester may be turned on by, for instance, interposing an AC gate or relay between transistor 16 and the secondary of transformer 30, said gate being rendered transmissive when the output of flip flop 32 of the present system is energized.

THRESHOLD TRIGGER 36 has an input connected to the output of tester 34 and is a voltage-sensitive threshold device. Whenever the level of the input voltage pulses thereto exceed a predetermined value, the output of trigger 36 will be energized with a fixed voltage.

FIXED KOH RE-ETCH TIMER 38 has an input connected to the output of trigger 36. When its input is pulsed by the output of trigger 36, the output of timer 38 will be energized for a period of 10 seconds, during which interval the timer will be insensitive to any further input pulses from trigger 36.

PROPORTIONAL PULSE CIRCUIT 40 is also connected to the output of tester 34. Circuit 40 is arranged to provide an unidirectional output voltage pulse whose duration and amplitude are proportional to the level of the pulses supplied thereto by tester 34. A typical output waveform of circuit 40 is illustrated at 41. The duration of the interval in which the output waveform exceeds indicated level S—S (the saturation level of circuit 42) will be proportional to the magnitude of the output pulses from tester 34.

Circuit 40 may comprise an amplifier arranged to receive the pulses from tester 34 and supply them to a half wave charging circuit, i.e., a shunt capacitor arranged to be charged from the amplifier through an isolating diode poled to prevent the discharge of the capacitor back into the output of the amplifier. Since the frequency, shape, and number of the applied pulses from tester 34 are constant, the charge placed on the capacitor will be proportional to the amplitude of these pulses. The discharge circuit of the capacitor is designed to have a fixed time constant. Therefore the peak amplitude and the duration of the indicated output voltage from circuit 40 will be proportional to the magnitude of the pulses supplied at the output of tester 34.

AMPLIFIER-LIMITER 42 is a saturable amplifier which is connected to the output of circuit 40 and which functions to time the proportional KOH re-etch. Timer 42 is arranged to supply an output which assumes a discrete level for an interval proportional to the interval in which the voltage supplied by circuit 40 exceeds saturation level S—S. Circuit 42 is a threshold type circuit arranged to provide a relatively square output pulse in response to the relatively hill-shaped input pulse shown in waveform 41. The parameters of circuits 40 and 42 are adjusted so that the maximum duration of the output of circuit 42 will be about 5 seconds.

Timer 42 may comprise an amplifier arranged to be easily saturated by the output of circuit 40. Normally the output of timer 42 will be slightly delayed with respect to the output of tester 34 by the part of charging time of the shunt capacitor in circuit 40.

In lieu of the aforedesribed arrangements for circuits 40 and 42, it will be apparent that any other circuitry arranged to provide a discrete output voltage proportional in duration to the magnitude of a fixed group of input pulses may be provided.

DELAY 44 includes an input inverter and is connected to the output of test timer 30, which, as discussed, is normally energized. Thus whenever its input becomes deenergized for a 0.5-second interval, delay 44 will supply a delayed 0.5-second output pulse. The delay provided in circuit 44 should be equal to or slightly longer than the propagation delay or circuits 40 and 42.

INHIBIT GATE 46 has an "IN" input *b* connected to the output of delay 44 and an INHIBIT (INH) input *a* connected to the output of proportional re-etch timer 42. If input *b* of gate 46 is energized, an output will be provided unless input *a* is also energized.

In actual operation, the output of gate 46 will be energized when etching of the diode is completed. Thus output of gate 46 may be connected to a suitable "off" indicator to indicate to an operator that etching is completed. Alternatively, the output of gate 46 may be arranged to actuate apparatus for automatically removing the diode carrier from the etching chamber, inserting a new carrier, and restarting the system if the process is fully automated.

FLIP FLOP 48 has a RESET input connected to start button 10 and a SET input connected to the output of Inhibit gate 46. When its SET input is energized, the output of flip flop 48 will be energized until its RESET input is energized.

OR GATE 50 has inputs *a* and *b* connected to the outputs of flip flop 48 and inhibit gate 22, respectively. The output of OR gate 50 will be energized if either or both of its inputs are energized.

It will be understood that within the scope of the invention other forms of the functional elements above described may be used. For instance any type bistable circuit, such as a series-connected tunnel diode-resistor-bias source combination may be used in lieu of a flip flop. Alternatively timer 30 may be arranged to have a 10.5-second interval and be actutaed by the leading edge of the output pulse from timer 28 with the presence of the output from timer 28 inhibiting the output of timer 30. Other similar modifications will occur to those skilled in the art. It will be understood that the terms "energized" and "signal" are used in their operational sense only so that a lead may be energized or supply a signal as these terms are used herein even when its potential is changed from a positive or negative value to zero volts, so long as zero volts will actuate the input of the succeeding functional element. The specific time intervals above discussed are suggested only and are in nowise to be considered as limiting. The time constant of each timing circuit is preferably made adjustable to facilitate optimization of individual operations. Suitable amplification should also be included where needed.

OPERATIONAL DESCRIPTION

*Process steps*

The operation of the system will be more easily understood if the process is first briefly detailed in step-by-step form.

(1) The start button is actuated and the diode is immediately subjected to a 5-second HAc rinse.

(2) The diode is next subjected to a 35-second KOH etch.

(3) The diode is next subjected to a 2.5-second $H_2O$ rinse.

(4) The diode's peak current is measured during the last half second of the $H_2O$ rinse interval.

(5) If the diode's peak current is above a predetermined high level, it is subjected to a fixed KOH re-etch of 9.5 seconds' duration.

(6) If the diode's peak current is below the high level, but above a predetermined low level, it is subjected to a KOH re-etch of a time interval (up to 5 seconds) proportional to the actual value of the peak current.

(7) If the diode's peak current is below the low level, etching is completed and the system will be inactivated. (This will rarely occur after the 35-second etch.)

(8) If a fixed or proportional re-etch has occurred, the diode will be re-etched, re-rinsed, and re-measured until its peak current is below the low level.

*Detailed operation*

The actual operation of the system will now be detailed in a step-by-step description. It will be assumed that after the 35-second etch, the diode's peak current will be such as to actuate the 10-second etch once, the proportional etch once, and thereafter turn off. The operation of the system when the diode has different peak current values after the 35-second etch will be apparent from a reading of the following description. Elapsed time references (e.g. T0–T5) refer to the times indicated in the waveform diagram of FIG. 2.

HAc rinse (T0–T5)

(1) When start button 10 is actuated, flip flop 48 will be RESET and rough etch timer 12 will be actuated, causing its output to be energized for 40 seconds.

(2) HAc rinse timer 14 will immediately respond to the output of timer 12 and the output of timer 14 will be energized for 5 seconds, causing solenoid 16 to supply an HAc rinse for 5 seconds.

35-second KOH rinse (T5–T40)

(3) The energized output of timer 12 will also cause the output of OR gate 18 and input *a* of AND gate 20 to be energized for 40 seconds, and since input *b* of gate 20 is normally energized by the output of test timer 30, the output of AND gate 20 and the *a* input of INHIBIT gate 22 will also be energized for 40 seconds.

(4) Since INHIBIT input *b* of gate 22 is energized for the first 5 seconds by the output of timer 14, there will be no output from gate 22 for the first 5 seconds. During the remaining 35 seconds the output of gate 22 will be energized, activating solenoid and relay 24 so that a 35-second KOH etch will be applied to the diode upon termination of the 5-second HAc rinse.

First $H_2O$ rinse and test (T40–T42.5)

(5) After the first 40 seconds, the input *a* and hence the output of AND gate 20 will be deenergized, activating $H_2O$ rinse solenoid 26 to effect a 2.5 second $H_2O$ rinse of the diode. $H_2O$ rinse timer 28 will also be activated, causing its output to be energized for 2 seconds when the output of AND gate 20 is deenergized.

(6) The trailing edge of the output pulse from $H_2O$ rinse timer 28 will: (1) SET flip flop 32, causing it to provide an output which will turn on tester 34, and (2) actuate test timer 30, deenergizing the normally energized output thereof for 0.5 second.

(7) Pursuant to the initial assumption, the output pulses from tester 34 will be of sufficient amplitude to actuate threshold trigger 36, indicating the diode's peak current is still high enough to require a fixed 10-second re-etch.

(8) The output of trigger 36 will activate fixed re-etch timer 38, thereby causing the output of re-etch timer 38 to energize input *a* of OR gate 18 for 10 seconds. (The output pulses from tester 34 will also cause circuit 40 to supply an output voltage to timer 42, which, in turn, will energize input *b* of OR gate 18 for a 5-second interval. However input *a* of OR gate 18 will be energized for a longer interval (i.e., 10 seconds) than input *b* thereof since circuit 42 is designed so that the maximum output therefrom will be insufficient to cause the output of circuit 42 to be energized for longer than about 5 seconds.)

(9) The output of OR gate 18 will energize input *a* of AND gate 20 for 10 seconds.

(10) When the output of test timer 30 (input *b* of gate 20) is reenergized (0.5 second after is was deenergized) the output of AND gate 20 will be energized, turning off rinse solenoid 26 and also energizing the RESET input of flip flop 32, via gates 22 and 50, which will turn off tester 34. (After the output of timer 30 was deenergized, delay 44 will have energized input *b* of INHIBIT gate 46 for 0.5 second. Gate 46 will not provide an output however, since input *a* thereof will be energized by the output of proportional re-etch timer 42 for an interval longer than input *b* is energized.) Thus the diode will have been rinsed in $H_2O$ for 2.5 seconds and tested during the last half-second of this interval.

Fixed KOH re-etch (T42.5–T52)

(11) The output of AND gate 20 will (at T42.5) also energize solenoid and relay 24 (via INHIBIT gate 22) to initiate a 9.5-second KOH re-etch.

(12) The output of timer 38 will become deenergized 9.5 seconds later (T52), causing the output of OR gate 18 and input *a* of AND gate 20 to become deenergized. When the output of AND gate 20 is deenergized, etch solenoid and relay 24 will be deenergized to terminate the fixed re-etch.

Second $H_2O$ rerinse and retest (T52–T54.5)

(13) When the output of AND gate 20 is deenergized at T52, a 2.5-second $H_2O$ rerinse and 0.5 second retest will occur in the manner previously described.

(14) Pursuant to the initial assumption, the diode now will have been etched sufficiently so that its peak current is down to a level where the magnitude of the output pulses from tester 34 will be insufficient to actuate trigger 36 but sufficient to initiate a proportional re-etch. The pulses from tester 34 (T54–T54.5) will cause circuit 40 to supply a proportional unidirectional voltage to timer 42, whose output will, in turn, be energized for a proportional interval, after the normal propagation delay inherent in circuit 40.

(15) The output of time 42 will energize input *b* of OR gate 18 at T54+, causing input *a* of AND gate 20 to be energized. When the output of test timer 30 reappears at T54.5, the output of AND gate 20 will be reenergized to RESET flip flop 32 (via gates 22 and 50) to turn off tester 34.

Proportional KOH re-etch (T54.5–T57)

(16) It will be assumed that the measured peak current value of the diode was such as to require a 2.5-second proportional re-etch. Accordingly it will be assumed that the output of proportional re-etch timer 42 will appear for slightly less than 3 seconds (T54+ to T57) to allow time for the 0.5-second test interval to elapse. When the output of test timer 30 reappears at T54.5, input *b* of AND gate 20 will be energized. Since both inputs of AND gate 20 are now present, AND gate 20 will supply an input to solenoid and relay 24 (via gate 22) for the remainder of the output of proportional re-etch timer 42, thus causing the diode to be re-etched for a 2.5-second interval, which, as assumed, was proportional to its previously measured peak current.

Third $H_2O$ rerinse and retest (T57–T59.5)

(17) When the output of timer 42 becomes deenergized at T57, the output of AND gate 20 will become deenergized, causing the diode to again be rinsed and tested.

Turn off

(18) Again consistent with the initial assumption, the diode will now have been etched so that its peak current is within the desired final range. Under this condition the magnitude of the output pulses from tester 34 (T59–T59.5) will be such as to cause the output of timer 42 to be energized for an interval less than the period of timer 30, i.e., from less than 0.5-second to nonexistent.

(19) The output of timer 30 will be deenergized for 0.5 second, from T59–T59.5. This will cause delay 44 to provide a delayed 0.5-second output pulse from T59 to T59.5. However timer 42 will provide no output or a pulse shorter than 0.5-second whose leading edge coincides with or slightly leads the 0.5-second pulse from delay 44. Thus INHIBIT input *a* of gate 46 will not be energized or will be deenergized when input *b* thereof is still energized, causing gate 46 to provide an output.

(20) The output of gate 46 will SET flip flop 48, causing input *a* of gate 50 to be energized. This will cause the RESET input of flip flop 32 to be continuously energized, preventing further recycling of the system. Such recycling might otherwise tend to occur since the output of timer 42, being inherently delayed, could cause input *a* of gate 20 to be energized when timer 30 reenergized input *b* thereof. In this event the output of gate 20 will actually initiate a brief re-etch followed by a continuous rinse, but, as stated, no further test cycles will occur. This brief re-etch will occur when the output of timer 42 is only slightly lass than 0.5-second in duration.

Although the invention has been described with reference to a specific application, i.e., the etching of a tunnel diode until its peak current reaches a desired range, it will be understood that within the scope of the invention will lie other interrelated processing and testing applications. For instance the one such application is the machining of a member until a predetermined dimension is achieved. Thus, for this application, machining could be performed in lieu of etching and during the test interval a measuring operation arranged to provide a voltage proportional to the dimension in interest could be actuated. Another such application would be the plating of a surface to a desired thickness. Other similar applications can be visualized.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

I claim:

1. In combination:

(a) means for supporting a tunnel diode,
(b) first means for etching said diode,
(c) second means for providing an indication of the peak current level of said diode,
(d) third means for initially actuating said second means,
(e) fourth means responsive to said second means for actuating said first means for a fixed interval if said second means determines the peak current level of said diode is above a first value,
(f) fifth means responsive to said second means for energizing said first means for an interval proportional to the peak current level of said diode if said second means determines the peak current level of said diode is below said first value,
(b) sixth means for reactuating said second means after each energization of said first means is completed,
(h) seventh means for preventing reactuation of said second means if said fifth means energizes said first means for less than said fixed interval, and
(i) eighth means for rinsing said diode after each energization of said first means.

2. A tunnel diode etcher, comprising, in combination:

(a) means for supporting a tunnel diode,
(b) testing means arranged to provide, when energized, a test voltage proportional to the peak current value of said diode,
(c) threshold means for providing a trigger signal when said test voltage is above a first level,
(d) fixed etch timer means for providing a first fixed duration signal in response to said trigger signal,
(e) proportional etch timer means for providing, in response to said test voltage, a proportional signal whose duration is proportional to said test voltage when below said first level,
(f) rinse timer means for providing a second fixed duration signal, whenever the means of clause (h) below ceases to supply an etch signal,
(g) test timer means for providing a third fixed duration signal upon termination of said second fixed duration signal,
(h) means for providing an etch signal whenever said first signal or said proportional signal is supplied, but not when said third signal is also supplied, (i) means for electrolytically etching said diode when said etch signal is supplied, (j) means for rinsing said diode when said etch signal is not supplied, and (k) bistable means having SET and RESET states and arranged to energize said test means when in its SET state, said bistable means arranged to be SET upon termination of said second fixed duration signal, and RESET when said etch signal is supplied.

3. The etcher of claim 2 further including means for preventing said bistable means from being SET if the duration of said proportional signal is less than the duration of said third fixed duration signal.

4. The etcher of claim 2 wherein said means for electrolytically etching is arranged to etch said diode with a KOH solution, said means for rinsing is arranged to rinse said diode with water, and said acidic rinse means is arranged to rinse said diode with acetic acid.

References Cited

UNITED STATES PATENTS

| | | | |
|---|---|---|---|
| 2,918,420 | 12/1959 | Sabins | 204—196 |
| 3,042,603 | 7/1962 | Kelley et al. | 204—143 |
| 3,258,612 | 6/1966 | Rubelmann | 204—196 |
| 2,948,642 | 8/1960 | MacDonald | 148—1.5 |
| 3,103,733 | 9/1963 | Favro et al. | 29—25.3 |
| 3,163,568 | 12/1964 | LeMieux | 156—17 |
| 3,181,983 | 5/1965 | Lape et al. | 156—17 |
| 3,224,904 | 12/1965 | Klein | 134—4 |
| 3,228,862 | 1/1966 | Vulcan | 204—143 |
| 3,242,061 | 3/1966 | Armostrong | 204—143 |
| 3,250,693 | 5/1966 | Amaya | 204—143 |

ROBERT K. MIHALEK, *Primary Examiner.*

JOHN H. MACK, *Examiner.*